United States Patent [19]

Smith

[11] Patent Number: 4,665,744
[45] Date of Patent: May 19, 1987

[54] COMBINED RAIN GAUGE AND WEATHER VANE

[76] Inventor: David G. Smith, Route 1, Box 40, Midland, Va. 22728

[21] Appl. No.: 736,354

[22] Filed: May 21, 1985

[51] Int. Cl.$^4$ .................... G01W 1/04; G01W 1/14
[52] U.S. Cl. .................................. 73/171; 73/188
[58] Field of Search .......................... 73/171, 188

[56] References Cited

U.S. PATENT DOCUMENTS

| | | |
|---|---|---|
| 916,060 | 3/1909 | Thomson ............................. 73/171 |
| 2,384,954 | 9/1945 | Moore .................................. 73/171 |
| 2,520,557 | 8/1950 | Moore .................................. 73/171 |
| 2,570,710 | 10/1951 | Quinteros ............................ 73/171 |
| 2,935,872 | 5/1960 | Misner ................................ 73/171 |
| 3,055,215 | 9/1962 | Ivie ..................................... 73/188 |
| 3,826,135 | 7/1974 | Hollmann ............................ 73/171 |

*Primary Examiner*—Donald O. Woodiel
*Attorney, Agent, or Firm*—Gipple & Hale

[57] ABSTRACT

A combined wind direction indicator and rain gauge is described in which the rain gauge is mounted on a vertically suspended sail at one end of a horizontally disposed elongated member which rotates in a horizontal circle in response to the force of inpinging wind. The rain gauge is so disposed that it is always maintained with its open mouth pointed into the direction of wind and at an angle of such that it coincides with the inclination of disending rainfall. Accuracy in measuring rainfall over a given period of time is thereby enhanced since the amount of rainfall collected will not be influenced by the angle of decent thereof. The device is further characterized by having a weighted head at the end of the elongated member remote from the rain gauge to counter balance the weight of the rain gauge and the sail on which it is mounted.

4 Claims, 4 Drawing Figures

COMBINED RAIN GAUGE AND WEATHER VANE

SUMMARY OF THE INVENTION

The present invention is directed to a combined rain gauge and weather vane which is disposed to respond to the force and direction of the impinging wind so that the rain gauge is always inclined in the same direction as the falling rain in order to receive and record accurately the amount of rain falling in a given period. The device of the invention is further characterized by the economy and simplicity of its structure as well as being ornamental.

BACKGROUND OF THE INVENTION

Various rain gauges, weather vanes and wind indicators have long been known in the prior art. It has also been suggested to combine these instruments in various ways in order and to have a single device which is capable of performing all functions. The devices of the prior art have however, frequently been both unattractive, complex and, in some instances, not totally functional.

It is accordingly an object of the present of the invention to provide a device which is simple and inexpensive of structure, pleasing in appearance and readily adapted into a variety of uses as well as functioning in the desired manner, which is to indicate the direction of impinging wind and to measure and record accurately the amount of rain falling over a given period even when this rain does not fall in a vertical direction.

DISCUSSION OF PRIOR ART

U.S. Pat. No. 916,060 to Thomson describes a combined weather vane and rain gauge in which a funnel like receptacle is mounted at one end of a weather vane to receive rain fall and communicate it by means of tubing to a holding or measuring tank.

U.S. Pat. No. 238,954 to J. B. Moore describes a rain gauge which consists essentially of a tiltable receptacle which is mounted atop a weather vane and provided with a fin to tip the receptacle in the direction of the impinging wind.

U.S. Pat. No. 2,935,872 to Misner describes a weather gauge having a provision for measuring the direction and velocity of wind and a rigidly disposed tube for receiving and collecting rain fall.

U.S. Pat. No. 3,826,135 to Hollmann describes a swinging rain gauge which consists essentially of a pivotly mounted fin which responds to the force of wind and a tubular rain collection gauge mounted on the fin to respond to the force of wind by tipping into it.

A BRIEF DESCRIPTION OF THE DRAWINGS

DETAILED DESCRIPTION OF THE INVENTION

The above described objects of the present invention are achieved by providing a combined wind direction indicator and rain gauge which comprises an elongated, horizontally disposed member which is pivotally mounted on an upright at about its mid point so that it is free to rotate in a full horizontal circle in response to the force and direction of impinging wind. At one end of the horizontally disposed elongated member there is pivotally mounted a generally flat sail or plate which has a plane having a rest position which is vertical and perpendicular to the horizontal axis of the elongated member. The flat sail is suspended from the end of the elongated member in such a way that it responds to the force of wind impinging on its surface to traverse an arc which is co-planar with the elongated member. Mounted on the flat sail in a upright vertical position is an elongated rain collecting tube which is closed at its lower end but has an open end which tips into the direction of the wind which impinges on the sail to cause it to swing away from its vertical rest position. In this way, the open tubular rain collecting gauge is always pointed to face into the direction of wind driven rain and to be disposed at an angle coincident with the wind driven rain so that it accurately receives and collects a full measure of rain falling in a given period. In order to maintain the device of the invention at its proper attitude and orientation, a weighted head is provided at the other end of the elongated horizontal member to counter balance the weight of the rain gauge and sail.

Figure 1:
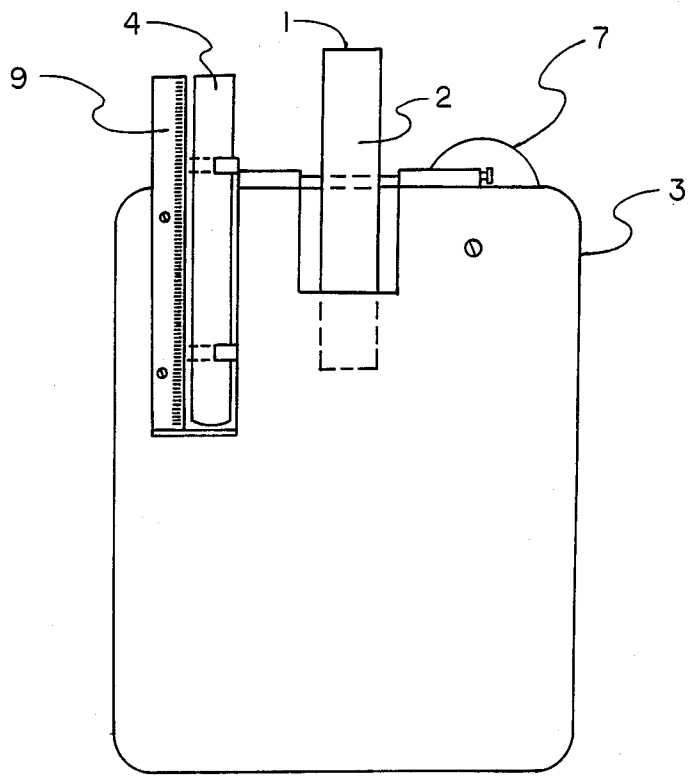
FIG. 1 is an end view of the device of the present invention at rest with zero wind velocity.
Figure 2:
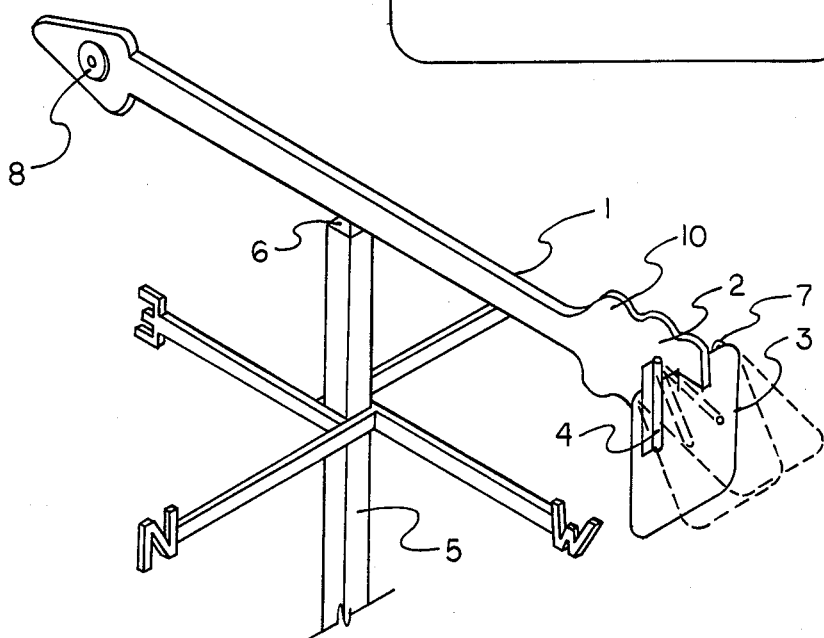
FIG. 2 is a perspective view of the device of the present invention showing various positions of the rain gauge in phantom in response to different wind velocities.
Figure 3:
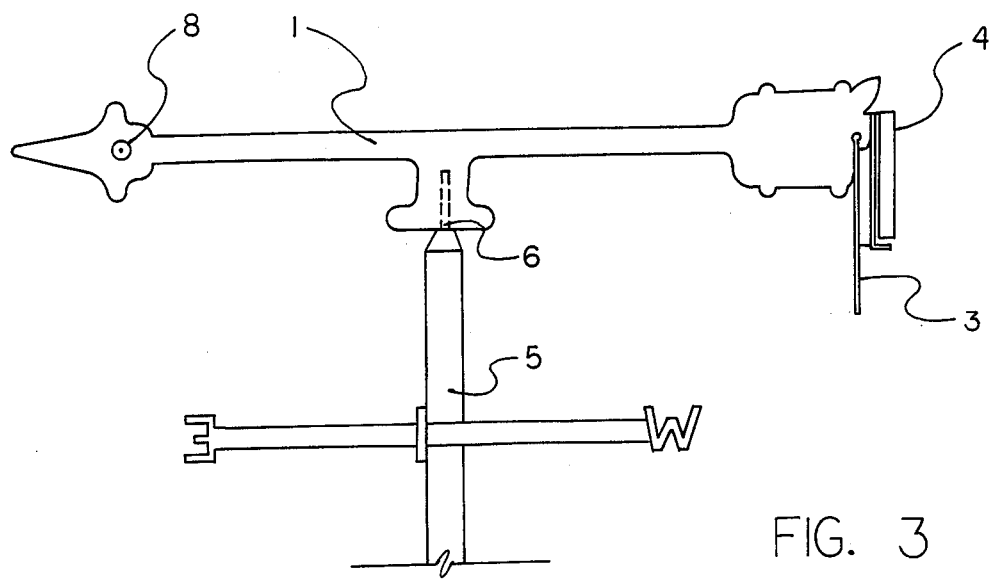
FIG. 3 is a side view at zero wind velocity.
Figure 4:
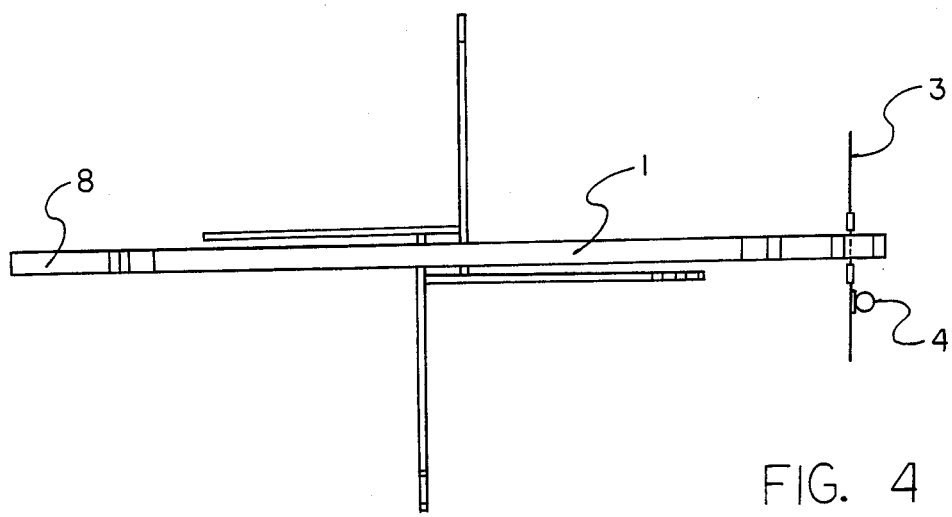
FIG. 4 is top view showing the combined rain gauge and weather vane at zero wind velocity.

The device in the present invention will however be more fully appreciated by having reference to the drawings which illustrate a preferred embodiment thereof. Directing attention to FIG. 2 of the drawings a horizontally disclosed elongated member 1 is pivotally mounted at about its mid-section 6 onto a vertical upright 5 so that it is free to rotate in a full horizontal circle in response to the force and direction of wind impinging on it. Disposed at one end 2 of the elongated member is a flat sail 3 which hangs in a rest position which is essentially vertical. As particularly shown in FIG. 1 of the drawings a tubular elongated receptacle 4 is mounted vertically onto the sail 3. This receptacle is adapted to receive rain fall and a scale to record the amount of rain fall received in the receptacle is provided along side at 9. The balance and attitude of the horizontal member 1 is preserved by providing a weighted head 8 which effectively counter balances the weight of the rain gauge and associated pivotally suspended sail. FIG. 2 of the drawing further illustrates in phantom the difference position and angles of inclination in which the rain gauge assumes in response to the force of wind directed against the sail 3. At 7 a dial gauge in conveniently positioned to permit recording of recorded rain fall in a cumulative manner.

The end of the elongated member, having the sail 3 attached is also provided with a laterally extending fin 10 which is adapted to receive the force of impinging wind to turn the elongated member and maintain the weighted head 8 pointing into the wind.

While a preferred embodiment of of the present invention has been described in detail above with reference to the accompanying drawings, it will be understood that other embodiments and modifications thereof are considered to be within the scope of the present invention as described and defined herein.

What is claimed is:

1. A combined wind direction indicator and rain gauge comprising an elongated horizontal member pivotally mounted on a vertical support such that said elongated member is free to rotate in a full horizontal circle in response to the force and direction of impinging wind; said elongated member having pivotally suspended at one of its ends a generally flat wind sail means such that the plane of said wind sail means has a rest position perpendicular to the horizontal axis of said elongated member and is disposed to traverse an arc coplanar with said elongated member in response to the force of wind impinging its surface; mounted on said wind sail means in an upright, vertical position, a tubular, elongated rain collecting means closed at its lower end and having an open, upper end disposed to tip into the direction of said wind impinging on said wind sail means to collect accompanying rainfall, the other end of said elongated member being provided with sufficient weight to counterbalance the weight of said wind sail and rain collecting means.

2. The indicator and gauge of claim 1 which also includes a calibrated scale alongside said rain collecting means to measure collected rain fall.

3. The indicator and gauge of claim 1 wherein said elongated member is pivotally mounted on said support at about its mid-point.

4. The indicator and gauge of claim 1 wherein the end of said elongated member having said wind sail attached thereto is itself extended laterally to form a fin which is coplanar with the longitudinal axis of said elongated member and adapted to receive the force of impinging wind to turn the elongated member and maintain the other end thereof pointing into the wind.

* * * * *